US012477188B1

(12) United States Patent
Pietruszka (10) Patent No.: US 12,477,188 B1
(45) Date of Patent: Nov. 18, 2025

(54) SYSTEM AND A METHOD FOR VOD CONTENT VIEWERSHIP TRACKING

(71) Applicant: PLUM RESEARCH S.A., Szczecin (PL)

(72) Inventor: Piotr Pietruszka, Szczecin (PL)

(73) Assignee: PLUM RESEARCH S.A., Warsaw (PL)

( * ) Notice: Subject to any disclaimer, the term of this patent is extended or adjusted under 35 U.S.C. 154(b) by 0 days.

(21) Appl. No.: 18/822,213

(22) Filed: Sep. 1, 2024

(30) Foreign Application Priority Data

Aug. 23, 2024 (EP) .................................. 24461613

(51) Int. Cl.
| | |
|---|---|
| H04N 7/16 | (2011.01) |
| H04N 21/218 | (2011.01) |
| H04N 21/437 | (2011.01) |
| H04N 21/472 | (2011.01) |
| H04N 21/4782 | (2011.01) |

(52) U.S. Cl.
CPC ....... H04N 21/4782 (2013.01); H04N 21/218 (2013.01); H04N 21/437 (2013.01); H04N 21/47202 (2013.01)

(58) Field of Classification Search
CPC ............ H04N 21/4782; H04N 21/218; H04N 21/437; H04N 21/47202
See application file for complete search history.

(56) References Cited

U.S. PATENT DOCUMENTS

| | | | |
|---|---|---|---|
| 2012/0060178 A1* | 3/2012 | Minakuchi | H04N 21/25866 725/93 |
| 2017/0250882 A1* | 8/2017 | Kellicker | H04L 65/612 |
| 2018/0007038 A1* | 1/2018 | Hsu | H04L 63/0254 |
| 2018/0349602 A1* | 12/2018 | Johns | G06F 21/552 |
| 2023/0291945 A1* | 9/2023 | Kulkarni | H04N 21/2393 |

* cited by examiner

*Primary Examiner* — Gigi L Dubasky
(74) *Attorney, Agent, or Firm* — Rivka Friedman (57) ABSTRACT

A method for tracking Video on Demand (VOD) content viewership that includes, at a user equipment (UE) device (130) operating a VOD access application for communicating with a VOD server that operates a VOD platform: detecting that the VOD access application communicates with the VOD server; capturing a session identifier used for communication between the VOD access application and the VOD server; sending a request to the VOD server for viewership information, the request comprising the captured session identifier; and receiving from the VOD server the viewership information corresponding to the captured session identifier.

19 Claims, 5 Drawing Sheets

REQUEST:
    GET /some/protected/resource HTTP/1.1
    Host: api.vod-example.com
    Cookie: sessionId=abc123; otherCookie=value
    User-Agent: MyCustomClient/1.0

RESPONSE:
    HTTP/1.1 200 OK
    Content-Type: application/json
    Content-Length: 150
    { "data": ... }

Fig. 4

REQUEST:
    GET /some/protected/resource HTTP/1.1
    Host: api.vod-example.com
    Authorization: Bearer your_oauth_token
    User-Agent: MyCustomClient/1.0

RESPONSE:
    HTTP/1.1 200 OK
    Content-Type: application/json
    Content-Length: 150
    { "data": ... }

Fig. 5

```json
{
  "data": [
    {
      "id": 1,
      "title": "Title_1",
      "type": "movie",
      "bookmark": 1234,
      "last_watched": "2024-07-25T14:30:00Z",
      "cover_link": "_cover_link_1",
      "duration": 7200
    },
    {
      "id": 2,
      "title": "Title_2",
      "type": "series",
      "bookmark": 4567,
      "last_watched": "2024-07-24T09:00:00Z",
      "cover_link": "_cover_link_2",
      "duration": 3600,
      "series_id": 101,
      "series_title": "Series_Title_1"
    },
    {
      "id": 3,
      "title": "Title_3",
      "type": "movie",
      "bookmark": 789,
      "last_watched": "2024-07-23T20:15:00Z",
      "cover_link": "_cover_link_3",
      "duration": 5400
    },
    {
      "id": 4,
      "title": "Title_4",
      "type": "series",
      "bookmark": 2345,
      "last_watched": "2024-07-22T18:45:00Z",
      "cover_link": "_cover_link_4",
      "duration": 3000,
      "series_id": 102,
      "series_title": "Series_Title_2"
    }
  ]
}
```

SYSTEM AND A METHOD FOR VOD CONTENT VIEWERSHIP TRACKING

BACKGROUND

The present invention pertains to tracking the viewership of Video on Demand (VOD) content.

With the rise of digital streaming platforms, the way people watch videos has changed significantly. Video on Demand (VOD) services have become increasingly popular, allowing users to watch content at their convenience. As more people use VOD services, it has become crucial for content providers, advertisers, and platform operators to track viewership accurately. This tracking helps understand user behavior, content popularity, and the effectiveness of advertisements. However, current methods for tracking VOD viewership have several challenges and limitations.

For instance, VOD platform operators can use server-side tracking, which involves collecting data directly from the streaming server. This method is comprehensive but requires direct access to server resources, making it available only to the platform operator. On the other hand, client-side tracking can be done by embedding tracking software within the video player on the user's device. This method collects data from users who allow access to their player software and is typically available to the software provider that develops the video player software.

Despite these methods, there is still a significant gap in collecting and aggregating viewership data across multiple VOD platforms in a standardized and efficient way. Current solutions are often fragmented and specific to each platform, making it hard for third parties to get a complete view of viewership metrics. Therefore, there is a need for a more robust and versatile solution that can collect and unify viewership data from various VOD platforms, providing comprehensive and actionable insights while addressing the challenges of existing methods.

SUMMARY OF THE INVENTION

The present invention provides a useful tool for tracking VOD content viewership within a panel, which is a group of users (also known as panelists) whose viewing habits are monitored to infer broader audience behavior. Panelists can voluntarily participate by allowing the installation of the software component described herein on their user equipment. This approach is advantageous as it enables the collection of comprehensive and standardized viewership data across multiple VOD platforms, thereby solving the problem of fragmented and platform-specific data collection methods.

The system and method described herein can be used with various VOD services, including Subscription Video on Demand (SVOD), Advertising-based Video on Demand (AVOD), Transactional Video on Demand (TVOD), Free Video on Demand (FVOD), and Hybrid Video on Demand (HVOD). For example, SVOD services like Netflix and Amazon Prime Video offer a vast library of content for a subscription fee. AVOD services like YouTube and Tubi provide free content supported by ads. TVOD services such as Apple iTunes and Google Play Movies allow users to rent or buy individual pieces of content. FVOD services offer free content without any subscription or transactional fees. HVOD is a hybrid of any of the VOD models, e.g., offering subscription tiers with ad-supported content at a lower price (like Netflix) or subscriptions, transactions, and free with ads viewership under one roof (like Amazon Prime Video).

The system's versatility allows it to integrate seamlessly with these different VOD models, capturing and aggregating viewership data to provide comprehensive insights regardless of the business model. This adaptability ensures that content providers, advertisers, and platform operators across different VOD services can benefit from accurate and actionable viewership metrics. The presented approach provides a unified view of user engagement across diverse VOD platforms, addressing the problem of data fragmentation.

In one aspect of the invention, there is provided a computer-implemented method for tracking Video on Demand (VOD) content viewership. The method involves a user equipment (UE) device operating a VOD access application to communicate with a VOD server. Upon detecting that the VOD access application is communicating with the VOD server, the method captures a session identifier used for the communication. Subsequently, a request for viewership information is sent to the VOD server, which includes the captured session identifier. The viewership information corresponding to the captured session identifier is then received from the VOD server. This method provides the technical advantage of enabling accurate and efficient tracking of VOD content viewership by mimicking legitimate requests from the VOD access application, without requiring direct access to user credentials. This solves the problem of needing direct server access or user credentials for viewership tracking.

In a preferred embodiment of the invention, capturing the session identifier involves capturing a session token from HTTP messages communicated between the VOD access application and the VOD server. This approach offers the technical advantage of leveraging existing communication protocols to obtain necessary session information seamlessly. The session token can be captured from various types of HTTP messages, such as GET or POST requests, providing flexibility in implementation. This solves the problem of needing custom solutions for different types of HTTP messages.

In another preferred embodiment, capturing the session identifier comprises accessing local storage of the UE device and collecting a cookie corresponding to the communication session between the VOD access application and the VOD server. This method provides the technical advantage of utilizing stored session data to facilitate viewership tracking.

In yet another preferred embodiment, when the VOD access application is a web browser, capturing the session identifier involves using a web browser extension. The extension detects that the web browser retrieves a web page of the VOD platform and injects a content script into the retrieved web page as it is loaded. The content script is configured to access the web browser's cookies and local storage to retrieve the session identifier. This embodiment offers the technical advantage of integrating seamlessly with web browsers to capture session data without user intervention. The web browser extension can be compatible with popular browsers such as Google Chrome, Mozilla Firefox, Microsoft Edge, and Safari. This solves the problem of requiring user intervention for data capture.

In a further preferred embodiment, when the VOD access application is a WebView component handled by a tracking application, capturing the session identifier involves accessing the session identifier via the WebView component. This method provides the technical advantage of enabling viewership tracking within applications that use WebView components for VOD access.

In another preferred embodiment, when the VOD access application is a web browser, a web browser extension is provided to set up a PerformanceObserver instance to listen to and partially intercept GET requests directed to the VOD platform. This setup detects that the VOD access application is communicating with the VOD server. This embodiment offers the technical advantage of monitoring and capturing session data (such as URL addresses that may contain information related to requested content) through browser events. These information can be used in combination with other data obtained from the VOD server based on session identifier.

In an additional preferred embodiment, the method further comprises communicating with a viewership tracking server to determine whether viewership information should be collected. The request to the VOD server is sent upon receiving confirmation from the viewership tracking server. This approach provides the technical advantage of optimizing data collection based on server-side decisions. The viewership tracking server can use criteria such as user consent, data collection frequency, and data completeness to make informed decisions.

In another preferred embodiment, the method includes transmitting the viewership information from the UE device to a viewership tracking server. This step ensures that the collected data is centralized for further analysis, providing the technical advantage of comprehensive viewership insights. The transmission can be performed using secure communication protocols such as HTTPS, ensuring data privacy and integrity.

In a further preferred embodiment, sending the request to the VOD server for viewership information involves requesting a list of content to continue watching. This method provides the technical advantage of capturing ongoing user engagement with user-specific content. The request can include parameters such as user profile ID, content type, and content category to tailor the response to the user's preferences.

In yet another preferred embodiment, sending the request to the VOD server for viewership information involves requesting viewership information for a specific content identifier. This approach offers the technical advantage of obtaining detailed viewership metrics for targeted content analysis. The content identifier can be a unique ID assigned to each piece of content, such as a movie ID, series ID, or episode ID. This solves the problem of obtaining granular viewership data.

The invention also relates to a user equipment device, configured to carry out the method as described herein. In particular, the user equipment device comprises a processor configured to execute instructions stored in a memory; and a memory storing instructions that, when executed by the processor, cause the user equipment device to carry out the steps of the method as described herein.

Furthermore, the invention relates to a computer program product comprising a non-transitory computer-readable medium having instructions stored thereon, the instructions, when executed by a processor at a user equipment (UE) device operating a VOD access application for communicating with a VOD server that operates a VOD platform, cause the processor to perform the steps of the method as described herein.

The invention also relates to a system for tracking Video on Demand (VOD) content viewership, the system comprising a viewership tracking server and a plurality of user equipment devices as described herein.

These and other features, aspects, and advantages of the invention will become better understood with reference to the following drawings, descriptions, and claims.

BRIEF DESCRIPTION OF THE DRAWINGS

The invention is shown by means of example embodiments in a drawing, wherein.

DETAILED DESCRIPTION

The following detailed description is of the best currently contemplated modes of carrying out the invention. The description is not to be taken in a limiting sense, but is made merely for the purpose of illustrating the general principles of the invention.

Figure 1:
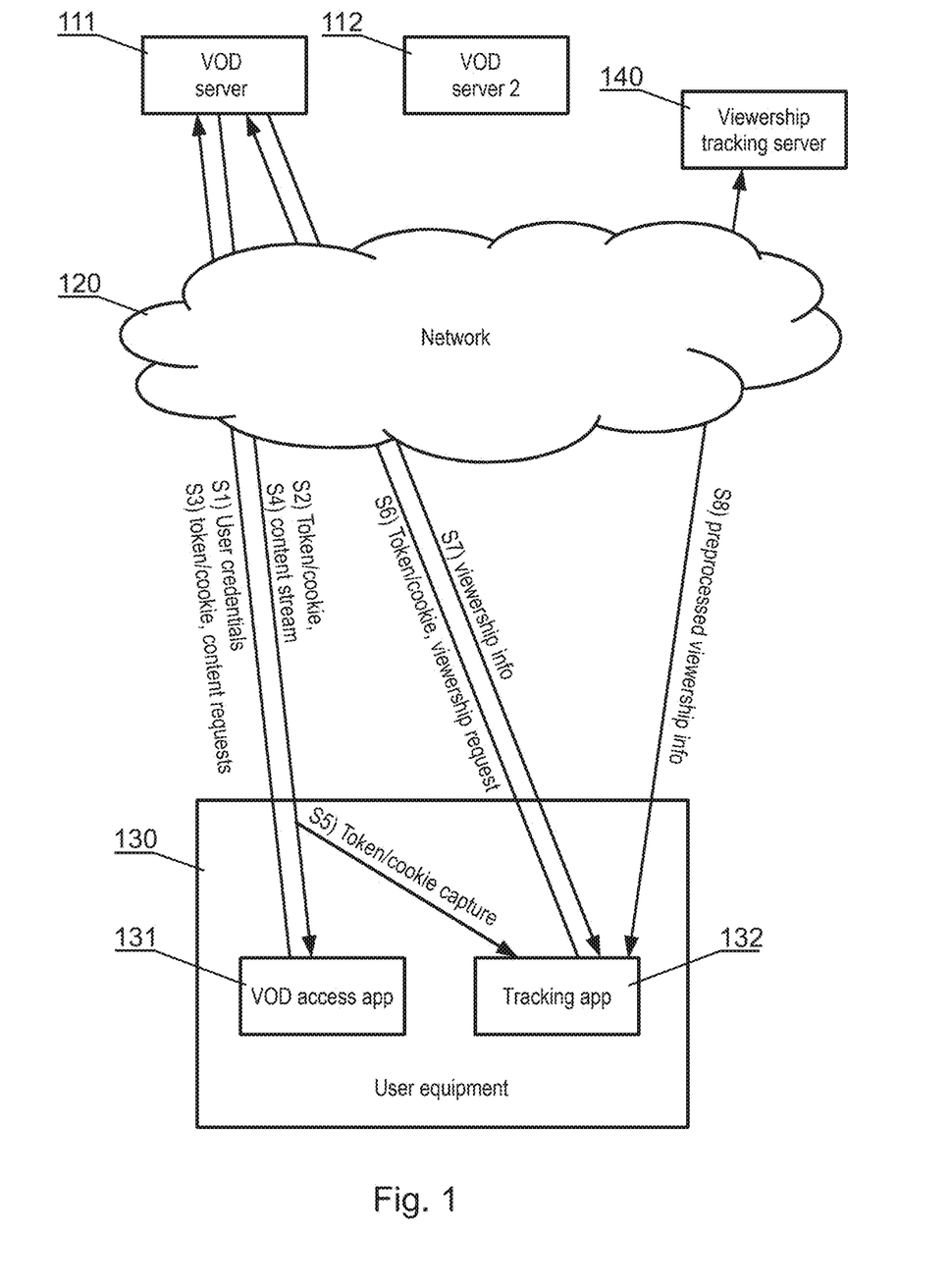
FIG. 1 shows a functional schematic of the system's operation within a content delivery environment.

FIG. 1 illustrates a functional schematic of the system's operation within a content delivery environment.

Multiple VOD servers 111, 112 are configured to deliver content to VOD service subscribers. Each VOD server can be operated by an independent service provider and can be accessed via different application program interfaces (APIs). The system described herein can communicate with any standard VOD server 111, 112 that uses an HTTP-like interface for handling standard GET and POST requests. Each server has a content management system (CMS) that stores and manages a library of video content. These servers process user requests, authenticate user credentials, and stream video content to user equipment (UE) devices 130. They also log detailed viewership data, such as what content has been completely watched or partially watched, to recommend similar content or allow users to resume watching from where they left off.

The term "VOD server" as used herein is intended to be understood in a broad sense. It can encompass a plurality of server machines working together or a cloud-based architecture that dynamically allocates resources based on demand. These servers can be distributed across various subdomains, each handling different aspects of the VOD service. For instance, one subdomain might handle user authentication, another might manage content delivery, and yet another might be responsible for logging viewership data. Furthermore, the VOD server can include various sub-elements such as content delivery network (CDN) components, which are designed to optimize the delivery of video content by caching it closer to the end-users. Therefore, the term "VOD server" can also be understood in a more general manner as a "VOD service," encompassing all the infrastructure and components required to deliver VOD content to users.

The VOD servers 111, 112 are accessible via a network 120, such as the Internet. This network serves as the communication backbone, facilitating data exchange between the VOD servers and the user equipment devices 130. The network infrastructure may include wired and wireless connections, routers, switches, and content delivery networks (CDNs) to optimize content delivery. Secure communication protocols like HTTPS are typically used to protect user data and ensure privacy.

Figure 7:
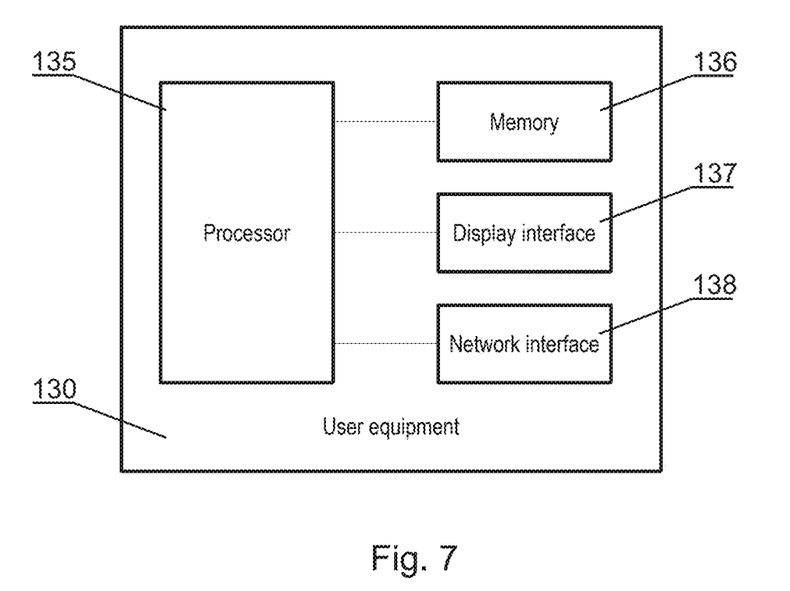
FIG. 7 shows hardware components of a user equipment device.

A user equipment (UE) device 130 can be a personal computer, a TV set, or a mobile device used to watch content. These devices are equipped with hardware components, as shown schematically in FIG. 7, including at least a processor 135, a memory 136 (which can be referred to also as a non-transitory computer-readable medium), (optionally) a display interface 137, and a network interface 138 to support video playback, and other components typical to a particular type of the UE device. The memory 136 stores software of an operating system (OS) and applications to be executed by the processor 135. In other words, the processor 135 is configured to execute instructions stored in the memory 136, the instructions causing the UE device 130 to execute the operating system and applications 131, 132 in order to perform the method as described herein.

The UE device 130 operates a VOD access application 131, such as a web browser or a dedicated VOD application, to communicate with the selected VOD server 111, 112 to post user's credentials and get content to be watched. The VOD access application 131 is responsible for rendering the user interface, managing user sessions, and handling playback controls.

Additionally, the UE device 130 operates a tracking application 132 configured to track the user's viewership of content accessed through the VOD access application 131, as will be explained below. The viewership information gathered by the tracking application 132 is transmitted to a viewership tracking server 140 that collects data from multiple UE devices 130 used by panelists.

The system operates as follows. First, in step S1, a user runs the VOD access application 131 to initiate a connection with the selected VOD server 111. This involves sending user credentials, such as a login and password, to authenticate the user within the VOD service. The VOD access application 131, which can be a web browser or a dedicated VOD application, sends an HTTP POST request to the VOD server 111. This request includes the user's credentials, which are typically encrypted using secure protocols such as HTTPS to ensure the confidentiality and integrity of the transmitted data. The VOD server 111, upon receiving the request, processes the credentials using its authentication module. This module verifies the credentials against a user database. If the credentials are valid, the server proceeds to the next step S2; otherwise, it returns an error message prompting the user to re-enter their credentials.

Upon successful authentication of the user, the VOD server 111 sends back, in step S2, a token or a cookie that will be used to handle the communication session. This is a standard procedure handled by typical VOD servers operating using standard access protocols, such as Open Authorization (OAuth) for token-based authentication or traditional session cookies for session management. The token or cookie is then used as a session identifier that allows the VOD server 111 to communicate with the particular user. The session identifier is typically delivered via standard HTTP mechanisms. The application stores the token in a storage area, such as the browser's local storage or the application's storage module, to be used in subsequent requests.

Consequently, in step S3, the user can send various requests to the VOD server 111, such as a request for receiving specific content to be watched, accompanied by the session identifier. The VOD access application 131 constructs an HTTP GET request to fetch the desired content. This request includes the previously received session identifier in the HTTP header to authenticate the session. The VOD server 111, upon receiving the request, validates the session identifier to ensure the session is still active and authorized. If the validation is successful, the server retrieves the requested content from its content management system. The server then streams the content in step S4 to the VOD access application 131 using a streaming protocol. For the purposes of streaming, the server may send a special content token to the client side. This content token is passed to the player, which then uses the content token to connect to the server for the actual streaming of the content.

The detailed description provided herein is primarily based on examples utilizing HTTP GET requests. However, it should be noted that some VOD implementations may also expect HTTP POST requests and may return data not only in JSON format but also in XML or even HTML for parsing. This flexibility allows the system to adapt to various API specifications and data formats used by different VOD platforms.

In step S5, the tracking application 132 captures the session identifier used for communication with the VOD server 111. This step allows for the tracking application 132 to gain access to the user's viewing session without needing the user's credentials. Step S5 can be initiated upon receiving instructions from the viewership tracking server indicating that it is necessary to collect viewership information for the user.

The tracking application 132 can capture the session identifier through several methods.

For example, in step S5 the tracking application 132 can be designed to intercept an HTTP response sent in step S2 from the VOD server 111 to the VOD access application 131. This can be achieved by integrating a network traffic monitoring module within the tracking application 132. The module listens to the network traffic on the UE device 130 and captures the session identifier from the HTTP headers of the responses originating from the specific VOD server 111. Alternatively, if the VOD access application 131 is a web browser, the tracking application 132 can be implemented as a browser extension. The extension can access the browser's cookies storage and retrieve the session identifier stored by the VOD access application 131.

Alternatively, in step S5 the tracking application 132 can be designed to intercept an HTTP request sent in step S3 from the VOD access application 131 to the VOD server 111 to retrieve the session identifier from this request.

For VOD access desktop-based applications using Chromium-based browsers such as Google Chrome, Microsoft Edge, and Opera, the tracking application 132 can employ advanced techniques to access session cookies and local storage data. In step S5, the tracking application 132 can decrypt the Chrome browser database to access session cookies. This involves utilizing cryptographic libraries to decrypt the database where Chrome stores its cookies. For desktop-based applications using other browsers, such as Firefox, cookies can be read without the need for decryption.

The tracking application 132 can then extract the session cookies needed for authenticating requests to the VOD server 111. Additionally, the tracking application 132 can access a separate browser database to retrieve data stored in local storage, such as authentication tokens or other session-related information. This method ensures that the tracking application 132 can seamlessly capture the necessary credentials to mimic legitimate user requests.

For browsers that support extensions, such as Chrome and other Chromium-compatible browsers, the tracking application 132 can be implemented as a browser extension. In step S5, upon detecting that the user has visited a web page of the VOD platform, the extension can inject a content script (JavaScript) into that web page as it is loaded by the web browser. The content script is configured to enable direct access to the session via cookies and can extract authentication tokens from the browser's local storage. This method allows the tracking application 132 to capture session information while the user is actively browsing the VOD platform.

For mobile and TV applications, the tracking application 132 can use WebView components to facilitate user authentication and session tracking. In that case, the user accesses the VOD platform via the WebView component of the tracking application 132, i.e. that WebView component acts as the VOD access application (131). In step S1, when the user logs into the VOD platform via the WebView component and interacts with the VOD platform as usual, the tracking application 132 gains direct access to the session cookies. The tracking application 132 can inject JavaScript code into the WebView to extract authentication tokens from the browser's local storage, depending on the form of authentication used by the VOD platform. This method ensures that the tracking application 132 can capture the necessary session information without requiring additional user intervention.

For VOD access applications using Chromium-based browsers, there is yet another data collection option available. The tracking application 132 can use a web browser extension that sets up a PerformanceObserver instance to intercept GET requests directed to a VOD platform. This method allows the tracking application 132 to access player events, such as start/stop, pause, and channel change, in a small number of platform cases. By intercepting these GET requests, the tracking application 132 can infer viewership data from these player events, providing insights into user behavior and content interaction.

In order to determine which tokens or cookies should be captured as the session identifier, the tracking application 132 may use results of initial analysis to determine specifics of communication with each VOD platform. This stage may involve analyzing the authentication and session management mechanisms of the VOD platform to identify the exact locations and formats of the required tokens or cookies. The process may result in a set of specific instructions that guide the tracking application on where to look for these authentication elements. For instance, it may identify that a particular VOD platform stores its session token under a specific key in the local storage or within a particular cookie.

During the initial analysis stage, the VOD platform's authentication flow can be analyzed to determine where session identifiers are stored. This analysis may include examining HTTP headers, local storage, and cookies to identify the exact keys and storage locations used by the VOD platform. The result can be a set of precise instructions that the tracking application follows to capture the necessary tokens or cookies.

Each solution, whether it be a mobile app, connected TV app, desktop app, or browser plugin, performs a check to the extent that its architecture allows. By leveraging these targeted methods, the tracking application 132 avoids the need to analyze full traffic from the user's device. Instead, it focuses on capturing specific pieces of information, such as session tokens or cookies, that are crucial for authenticating requests to the VOD server. This approach not only enhances the efficiency of the data collection process but also minimizes the potential impact on the user's device performance and privacy.

Once the tracking application 132 has captured the session identifier, it proceeds to step S6, where it sends a viewership information request to the VOD server 111. This request mimics a legitimate request from the VOD access application 131, ensuring that the VOD server 111 responds with the desired viewership information. The tracking application 132 may construct an HTTP GET request compliant with the API specifications of the VOD server 111. The request includes the captured session identifier in the HTTP header to authenticate the session. The request URL and parameters are crafted to request specific viewership information, such as a list of watched content or a list of content to continue watching. The request is then sent to the VOD server 111.

Upon receiving the request, the VOD server 111 validates the session identifier to ensure the session is authorized. If the validation is successful, the VOD server 111 processes the request and retrieves the requested viewership information from its database. The server then constructs an HTTP response containing the viewership information and sends it back to the tracking application 132 in step S7, as if it were sent to the VOD access application 131. Consequently, the tracking application 132 receives the viewership information from the VOD server 111, and performs parsing and processing the received data to extract meaningful insights. The response typically includes a JSON or XML payload containing the viewership information. The response data can be converted into a structured format that can be easily processed by the application.

In step S8 the tracking application 132 performs data validation and cleaning to ensure the integrity and accuracy of the extracted viewership information. This may involve checking for missing or malformed data, verifying data types, discarding information that has been already processed and applying any necessary transformations to standardize the data format. The preprocessed viewership information is then transmitted to the viewership tracking server 140. The tracking application 132 can aggregate the viewership information from multiple requests or send the information instantaneously after executing each request. The viewership information can be transmitted to the viewership tracking server 140 using standard secure communication protocols.

The tracking application 132 can use a background script, known as a service worker, to access session data without the user being on the VOD platform's website, in case the system uses a browser extension. The service worker runs in the background and can intercept network requests, allowing the tracking application 132 to capture and process viewership data even when the user is not actively using the VOD platform.

To improve the system's ability to collect viewership data even when the tracking application 132 implemented as Android mobile or TV app is not active, the system can use background processing features such as JobScheduler. This ensures that the tracking application 132 can continue gathering data even when the user is not actively using the VOD access application 131. Consequently, the tracking application 132 can be executed according to a predefined schedule to communicate with the viewership tracking server 140 to check whether viewership data shall be collected from a particular VOD service, and perform the collection upon receiving confirmation from the viewership tracking server 140. These background tasks can be set to run at specific times. This method ensures systematic data collection, providing a more complete picture of user behavior.

To ensure efficient use of network resources and minimize the potential for data congestion, the system may incorporate an optimization mechanism that regulates the frequency of data transfers from the user equipment (UE) device to the viewership tracking server in step S8. For example, the tracking application can be configured to limit data transmission to no more frequently than once per hour. This approach balances the need for timely data collection with the necessity of reducing network load and conserving bandwidth, thereby optimizing the overall performance of the system.

The same data collection and transmission scheme can be applied to additional data types available on VOD platforms. For example, the system can be configured to collect data on user subscriptions, the types of devices used for viewing, and other relevant metrics.

The viewership tracking server 140 collects data from multiple UE devices 130 used by panelists, giving a comprehensive view of viewership metrics across different VOD platforms. The server can then analyze this data further, generating insights into user behavior, content popularity, and advertising effectiveness. These insights can help content providers, advertisers, and platform operators make informed decisions and improve their services.

Figure 2:
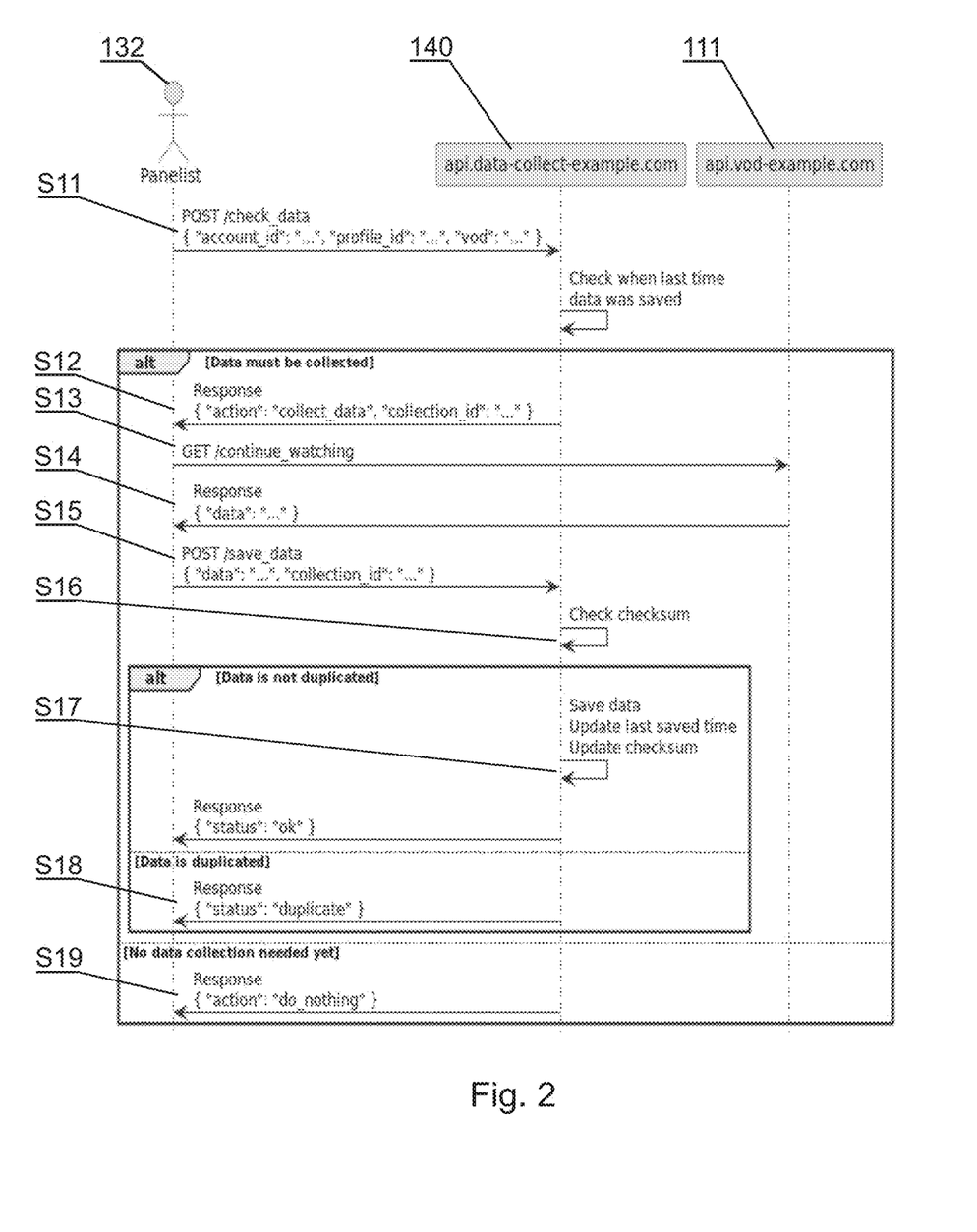
FIG. 2 shows a detailed sequence diagram of information exchange between a tracking application, a VOD server and a viewership tracking server.

FIG. 2 shows a detailed sequence diagram of information exchange between the tracking application 132, the VOD server 111 and the viewership tracking server 140. This process is initiated when a panelist's user equipment (UE) device, running the tracking application, communicates with the viewership tracking server 140 to determine if data collection is necessary. In step S11, the tracking application 132 on the panelist's UE device sends a POST request to the viewership tracking server 140 (DataCollectAPI) at "api-.data-collect-example.com". This request includes the panelist's account ID, profile ID, and the VOD service identifier. The viewership tracking server 140 processes this request by checking when the data was last stored for the given account and profile.

If the viewership tracking server 140 determines that data collection is necessary, it responds to the tracking application with a JSON payload indicating that data should be collected, along with a unique collection ID (step S12). The tracking application then proceeds to step S13, where it sends a GET request to the VOD server 111 to retrieve the user's continue watching history. This step is analogous to step S6 in FIG. 1, where the tracking application mimics a legitimate request from the VOD access application.

Upon receiving the GET request, the VOD server 111 validates the session identifier and, if authorized, processes the request to retrieve the continue watching history. The VOD server 111 then sends back a response containing the requested data in step S14. This response is received by the tracking application 132, which parses and processes the data to extract meaningful insights, as described in step S7 of FIG. 1.

In step S15, the tracking application sends a POST request to the viewership tracking server to store the collected data. This request includes the retrieved viewership data and the collection ID provided earlier. The viewership tracking server processes this request by checking the checksum (step S16) of the received data to determine if it is duplicated. This step corresponds to step S8 in FIG. 1, where the tracking application ensures the integrity and accuracy of the data before transmission.

If the data is not duplicated (step S17), the viewership tracking server stores the data, updates the last stored time, updates the checksum and returns a corresponding response. This ensures that the data is stored accurately and can be used for further analysis. If the data is found to be duplicated (step S18), the viewership tracking server responds to the tracking application with a status indicating that the data is a duplicate, and no further action is taken.

If the viewership tracking server determines that no data collection is needed (step S19), it responds to the tracking application with a JSON payload indicating that no action is required. This step ensures that the tracking application does not perform unnecessary data collection, optimizing the system's efficiency.

Figure 3:
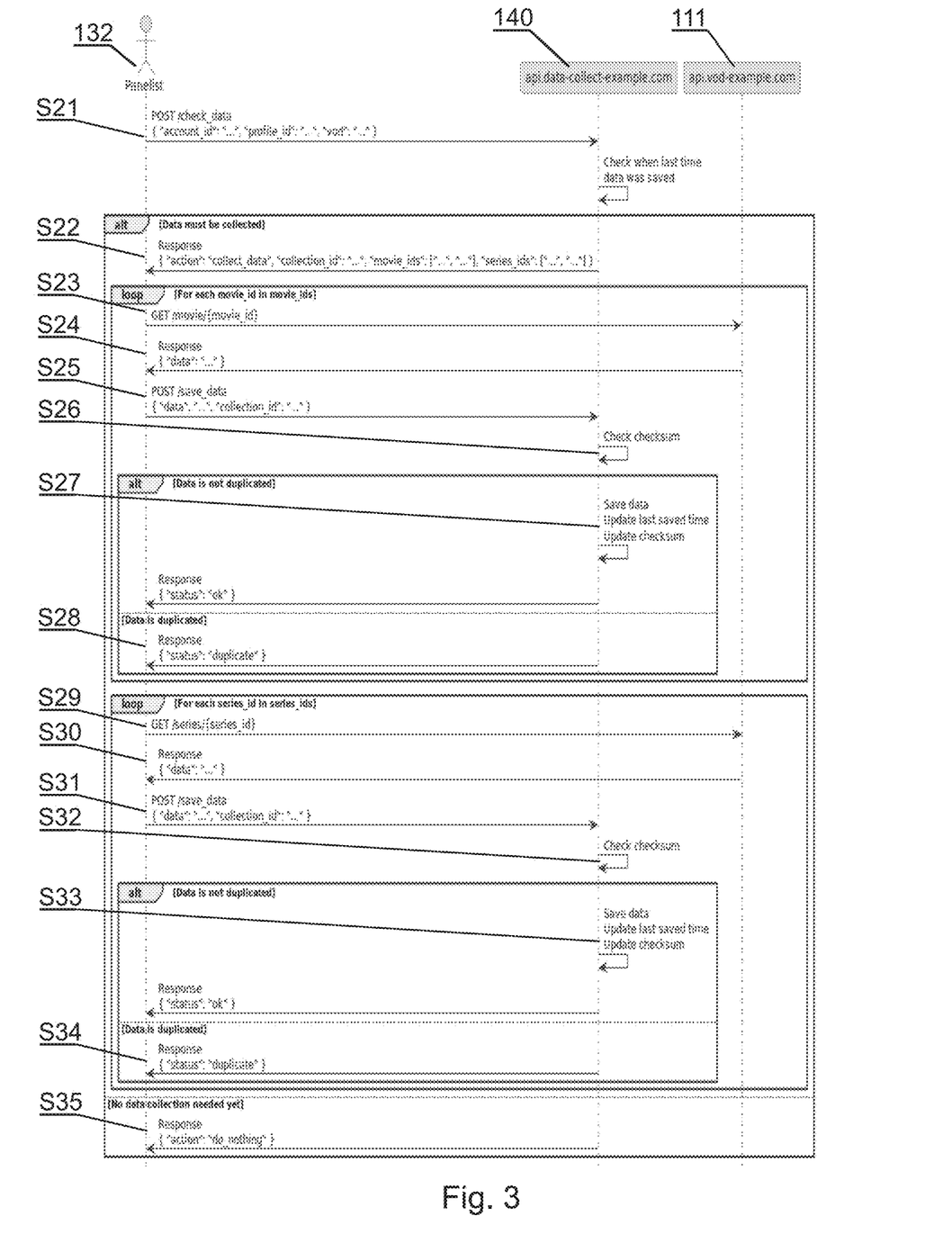
FIG. 3 shows a detailed sequence diagram of collecting watching progress based on a predefined list.

FIG. 3 illustrates a detailed sequence diagram of collecting watching progress based on a predefined list. This process begins when a panelist's user equipment (UE) device 130, running the viewership tracking application 132, communicates with the viewership tracking server 140 to determine if data collection is necessary. In step S21, the tracking application 132 on the panelist's UE device sends a POST request to the viewership tracking server 140. This request includes the panelist's account ID, profile ID, and the VOD service identifier. The viewership tracking server 140 processes this request by checking when the data was last stored for the given account and profile.

If the viewership tracking server determines that data collection is necessary, it responds to the tracking application with a JSON payload indicating that data should be collected, along with a unique collection ID and lists of movie IDs and series IDs (step S22). The tracking application then proceeds to iterate over each movie ID in the provided list. For each movie ID, the tracking application sends a GET request to the VOD server 111 (step S23) to retrieve the movie's viewing progress (alternatively, the GET request may be related to more than one movie ID). Upon receiving the GET request, the VOD server 111 validates the session identifier and, if authorized, processes the request to retrieve the requested data. The VOD server then sends back a response containing the requested data (step S24). This response is received by the tracking application 132, which parses and processes the data to extract meaningful insights.

Next, the tracking application sends a POST request (step S25) to the viewership tracking server 140 to store the collected data. This request includes the retrieved viewership data and the collection ID provided earlier. The viewership tracking server processes this request by checking the checksum of the received data to determine if it is duplicated (step S26). If the data is not duplicated, the viewership tracking server stores the data, updates the last stored time, updates the checksum (step S27) and provides a corresponding response. If the data is found to be duplicated, the viewership tracking server responds to the tracking application with a status indicating that the data is a duplicate, and no further action is taken (step S28).

The tracking application then proceeds to iterate over each series ID in the provided list. For each series ID, the tracking application sends a GET request (step S29) to the VOD server to retrieve the series' viewing progress. Upon receiving the GET request, the VOD server validates the session identifier and, if authorized, processes the request to retrieve the requested data. The VOD server then sends back a response containing the requested data (step S30). This response is received by the tracking application, which parses and processes the data to extract meaningful insights.

Next, the tracking application sends a POST request (step S31) to the viewership tracking server 140 to store the collected data. This request includes the retrieved viewership data and the collection ID provided earlier. The viewership tracking server 140 processes this request by checking the checksum of the received data to determine if it is duplicated (step S32). If the data is not duplicated, the viewership tracking server stores the data, updates the last stored time, updates the checksum (step S33) and provides a corresponding response. If the data is found to be duplicated, the viewership tracking server responds to the tracking application with a status indicating that the data is a duplicate, and no further action is taken (step S34).

If the viewership tracking server determines that no data collection is needed, it responds to the tracking application with a JSON payload indicating that no action is required (step S35). This step ensures that the tracking application does not perform unnecessary data collection, optimizing the system's efficiency.

Examples of Data Structures and Requests

Figure 4:
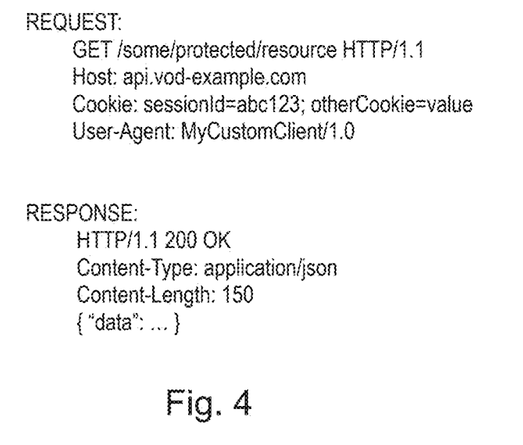
FIG. 4 shows an example HTTP request to a VOD server using cookies and a corresponding response.

FIG. 4—Example HTTP Request to VOD Server Using Cookies

In this example, the tracking application 132 constructs an HTTP GET request to the VOD server 111 using a session cookie captured in step S5. This request mimics a legitimate request from the VOD access application 131. Upon receiving this request, the VOD server 111 validates the session cookie to ensure the session is authorized. If the validation is successful, the server processes the request and retrieves the requested resource. The server then constructs an HTTP response containing the requested data and sends it back to the tracking application 132 in step S7. The tracking application 132 then parses and processes the received data to extract meaningful insights, as described in step S8.

Figure 5:
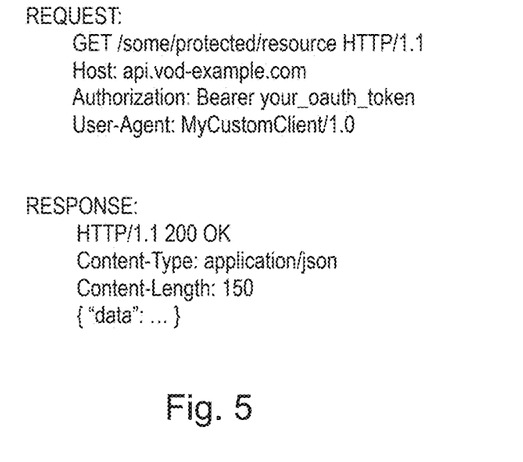
FIG. 5 shows an example HTTP request to a VOD server using OAuth token and a corresponding response.

FIG. 5—Example HTTP Request to VOD Server Using OAuth Token

In this example, the tracking application 132 constructs an HTTP GET request to the VOD server 111 using an OAuth token obtained in step S5. This request is designed to mimic a legitimate request from the VOD access application 131. Upon receiving this request, the VOD server 111 validates the OAuth token to ensure the session is authorized. If the validation is successful, the server processes the request and retrieves the requested resource. The server then constructs an HTTP response containing the requested data and sends it back to the tracking application 132 in step S7. The tracking application 132 then parses and processes the received data to extract meaningful insights, as described in step S8.

While FIGS. 4 and 5 illustrate examples of HTTP GET requests, it is also possible for these requests to be implemented as HTTP POST requests. In such cases, the token used for authentication can be sent in the query string of an HTTP request or included in the body of a POST request. Additionally, the token could be transmitted in another header, such as a custom header, depending on the specific requirements of the VOD service being tracked. This adaptability ensures that the system can be configured to meet the authentication and data retrieval protocols of any given VOD platform, without imposing restrictions on the implementer.

Figure 6:
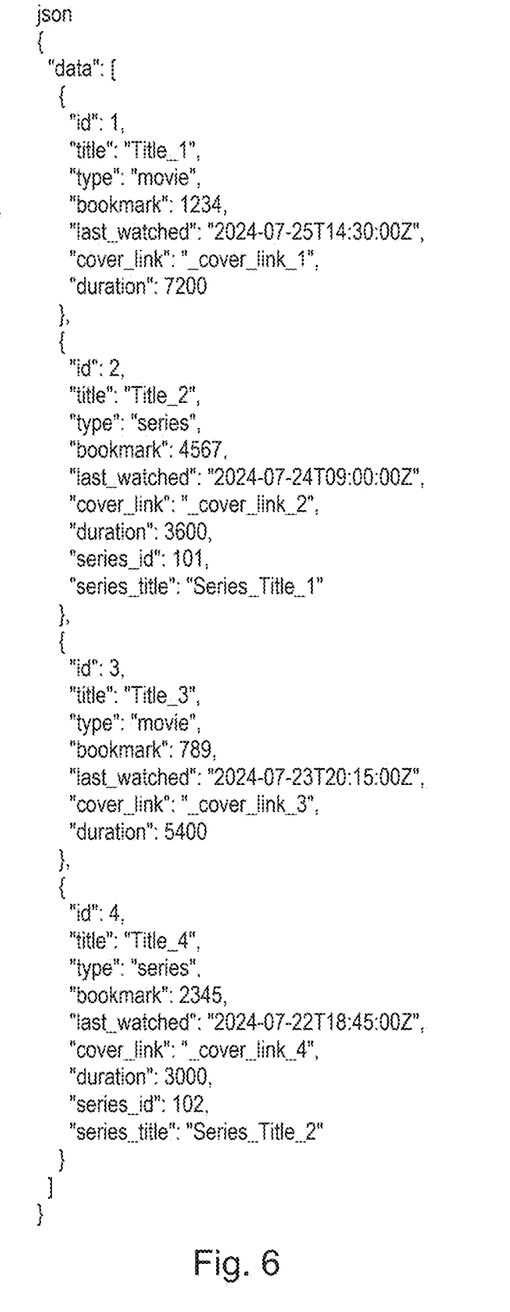
FIG. 6 shows an example format of viewership data sent in response to a GET request by the VOD server.

FIG. 6—Example Continue Watching/History Response

FIG. 6 shows an example format of viewership data sent in response to a GET request by the VOD server 111 in step S7. Upon receiving the viewership data, the tracking application 132 then parses and processes the received data to extract meaningful insights, as described in step S8. The basic data is common to both series and movies, with series having additional fields such as 'series_id' and 'series_title'. It is crucial to operate on the 'id' field while treating the fields with titles as metadata, as the titles may be in the panelist's specific language, which may differ among panelists.

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A method for tracking Video on Demand (VOD) content viewership, the method comprising, at a user equipment (UE) device operating a VOD access application for communicating with a VOD server that operates a VOD platform:
    detecting that the VOD access application communicates with the VOD server;
    capturing a session identifier used for communication between the VOD access application and the VOD server by intercepting the session identifier from an active authenticated session between the VOD access application and the VOD server;
    sending a request to the VOD server for viewership information, the request comprising the captured session identifier; and
    receiving from the VOD server the viewership information corresponding to the captured session identifier.

2. The method of claim 1, wherein capturing the session identifier comprises capturing a session token from Hypertext Transfer Protocol (HTTP) messages communicated between the VOD access application and the VOD server.

3. The method of claim 1, wherein capturing the session identifier comprises accessing local storage of the UE device and collecting a cookie corresponding to the communication session between the VOD access application and the VOD server.

4. The method of claim 1, wherein the VOD access application is a web browser, and capturing the session identifier comprises, by means of a web browser extension, detecting that the web browser retrieves a web page of the VOD platform and injecting a content script into the retrieved web page of the VOD platform as it is loaded by the web browser, wherein the content script is configured to access the web browser's cookies and local storage to retrieve the session identifier.

5. The method of claim 1, wherein the VOD access application is a WebView component handled by a tracking application, and capturing the session identifier comprises accessing the session identifier via the Web View component.

6. The method of claim 1, wherein the VOD access application is a web browser, and the method further comprises providing a web browser extension configured to set up a PerformanceObserver instance to intercept GET requests directed to the VOD platform, in order to detect that the VOD access application communicates with the VOD server, listen and partially intercept GET requests directed to the VOD server, capture session data from the GET requests and combine the captured session data with viewership information corresponding to the captured session identifier.

7. The method of claim 1, further comprising communicating with a viewership tracking server to determine whether viewership information shall be collected and proceeding to send the request to the VOD server upon receiving a confirmation from the viewership tracking server.

8. The method of claim 1, further comprising transmitting the viewership information from the UE device to a viewership tracking server.

9. The method of claim 1, wherein sending the request to the VOD server for viewership information comprises sending a request to provide a list of content to continue watching.

10. The method of claim 1, wherein sending the request to the VOD server for viewership information comprises sending a request to provide viewership information for a specific content identifier.

11. A computer program product comprising a non-transitory computer-readable medium having instructions stored thereon, the instructions, when executed by a processor at a user equipment (UE) device operating a VOD access application for communicating with a VOD server that operates a VOD platform, cause the processor to:
  detect that the VOD access application communicates with the VOD server,
  capture a session identifier used for communication between the VOD access application and the VOD server by intercepting the session identifier from an active authenticated session between the VOD access application and the VOD server;
  send a request to the VOD server for viewership information, the request comprising the captured session identifier; and
  receive from the VOD server the viewership information corresponding to the captured session identifier.

12. A user equipment device, comprising:
  a processor configured to execute instructions stored in a memory;
  a memory storing instructions that, when executed by the processor, cause the user equipment device to:
  operate a VOD access application for communicating with a VOD server that operates a VOD platform;
  detect that the VOD access application communicates with the VOD server;
  capture a session identifier used for communication between the VOD access application and the VOD server by intercepting the session identifier from an active authenticated session between the VOD access application and the VOD server;
  send a request to the VOD server for viewership information, the request comprising the captured session identifier; and
  receive from the VOD server the viewership information corresponding to the captured session identifier.

13. The user equipment device of claim 12, wherein capturing the session identifier comprises capturing a session token from Hypertext Transfer Protocol (HTTP) messages communicated between the VOD access application and the VOD server.

14. The user equipment device of claim 12, wherein capturing the session identifier comprises accessing local storage of the UE device and collecting a cookie corresponding to the communication session between the VOD access application and the VOD server.

15. The user equipment device of claim 12, further configured to communicate with a viewership tracking server to determine whether viewership information shall be collected and proceeding to send the request to the VOD server upon receiving a confirmation from the viewership tracking server.

16. The user equipment device of claim 12, further configured to transmit the viewership information from the UE device to a viewership tracking server.

17. The user equipment device of claim 12, wherein sending the request to the VOD server for viewership information comprises sending a request to provide a list of content to continue watching.

18. The user equipment device of claim 12, wherein sending the request to the VOD server for viewership information comprises sending a request to provide viewership information for a specific content identifier.

19. A system for tracking Video on Demand (VOD) content viewership, the system comprising:
  a viewership tracking server; and
  a plurality of user equipment devices configured to:
  operate a VOD access application for communicating with a VOD server that operates a VOD platform;
  detect that the VOD access application communicates with the VOD server;
  capture a session identifier used for communication between the VOD access application and the VOD server by intercepting the session identifier from an active authenticated session between the VOD access application and the VOD server;
  send a request to the VOD server for viewership information, the request comprising the captured session identifier; and
  receive from the VOD server the viewership information corresponding to the captured session identifier;
  transmit the viewership information to the viewership tracking server.

* * * * *